United States Patent
Hamza et al.

(10) Patent No.: US 8,320,615 B2
(45) Date of Patent: Nov. 27, 2012

(54) SYSTEMS AND METHODS FOR RECOGNIZING A TARGET FROM A MOVING PLATFORM

(75) Inventors: Rida M. Hamza, Maple Grove, MN (US); Mohammed Ibrahim Mohideen, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 1026 days.

(21) Appl. No.: 12/329,276

(22) Filed: Dec. 5, 2008

(65) Prior Publication Data

US 2009/0214079 A1    Aug. 27, 2009

Related U.S. Application Data

(60) Provisional application No. 61/031,905, filed on Feb. 27, 2008.

(51) Int. Cl.
G06K 9/62 (2006.01)

(52) U.S. Cl. .......................... 382/103; 382/317

(58) Field of Classification Search .................. 382/103, 382/104, 199, 217, 218, 281
See application file for complete search history.

(56) References Cited

U.S. PATENT DOCUMENTS

| | | | |
|---|---|---|---|
| 2,978,177 A | 4/1961 | Newell et al. | 235/186 |
| 3,775,767 A | 11/1973 | Fielding | 343/6.5 R |
| 4,970,653 A | 11/1990 | Kenue | 364/461 |
| 5,018,218 A | 5/1991 | Peregrim et al. | 382/22 |
| 5,052,045 A * | 9/1991 | Peregrim et al. | 382/30 |
| 5,075,776 A | 12/1991 | Cheung | 358/222 |
| 5,109,425 A | 4/1992 | Lawton | 382/1 |
| 5,265,173 A | 11/1993 | Griffin et al. | 382/22 |
| 5,280,530 A | 1/1994 | Trew et al. | 382/1 |
| 5,508,930 A | 4/1996 | Smith, Jr. | 364/444 |
| 5,745,173 A | 4/1998 | Edwards et al. | 348/208 |
| 5,798,786 A | 8/1998 | Lareau et al. | 348/144 |
| 5,878,165 A | 3/1999 | Ono | 382/199 |
| 5,982,930 A | 11/1999 | Neff et al. | 382/209 |
| 6,005,609 A | 12/1999 | Cheong | 348/169 |
| 6,072,525 A | 6/2000 | Kaneda | 348/208 |
| 6,144,338 A | 11/2000 | Davies | 342/357.13 |
| 6,172,641 B1 | 1/2001 | Millington | 342/357.13 |
| 6,249,590 B1 | 6/2001 | Young et al. | 382/103 |
| 6,259,803 B1 | 7/2001 | Wirtz et al. | 382/103 |
| 6,489,922 B1 | 12/2002 | Lin et al. | 342/357.14 |
| 6,507,660 B1 | 1/2003 | Wirtz et al. | 382/103 |

(Continued)

OTHER PUBLICATIONS

USPTO Office Action for U.S. Appl. No. 12/359,916; Notification Date Sep. 23, 2011.

(Continued)

*Primary Examiner* — Andrew W Johns
(74) *Attorney, Agent, or Firm* — Ingrassia Fisher & Lorenz, P.C.

(57) ABSTRACT

Systems and methods for recognizing a location of a target are provided. One system includes a camera configured to generate first data representing an object resembling the target, a memory storing second data representing a template of the target, and a processor. The processor is configured to receive the first data and the second data, and determine that the object is the target if the object matches the template within a predetermined percentage error. A method includes receiving first data representing an object resembling the target, receiving second data representing a template of the target, and determining that the object is the target if the object matches the template within a predetermined percentage error. Also provided are computer-readable mediums including processor instructions for executing the above method.

20 Claims, 5 Drawing Sheets

U.S. PATENT DOCUMENTS

| | | | |
|---|---|---|---|
| 6,574,353 B1 * | 6/2003 | Schoepflin et al. | 382/103 |
| 6,867,799 B2 | 3/2005 | Broemmelsiek | 348/169 |
| 7,071,970 B2 | 7/2006 | Benton | 348/208.14 |
| 7,120,875 B2 | 10/2006 | Daily et al. | 715/757 |
| 7,127,107 B2 | 10/2006 | Kubota et al. | 382/199 |
| 7,136,505 B2 | 11/2006 | Wenzel et al. | 382/103 |
| 7,162,101 B2 | 1/2007 | Itokawa et al. | 382/282 |
| 7,231,087 B2 | 6/2007 | Huber | 382/222 |
| 7,248,963 B2 | 7/2007 | Baiada et al. | 701/120 |
| 7,250,966 B1 | 7/2007 | Engelsberg | 348/208.3 |
| 7,265,661 B2 | 9/2007 | Satou | 340/461 |
| 7,283,645 B2 | 10/2007 | Krumm et al. | 382/103 |
| 7,295,682 B2 | 11/2007 | Otsuka et al. | 382/103 |
| 7,315,324 B2 | 1/2008 | Cleveland et al. | 348/208.4 |
| 2003/0146869 A1 | 8/2003 | Lin et al. | 342/357.14 |
| 2003/0185420 A1 | 10/2003 | Sefcik et al. | 382/103 |
| 2003/0235327 A1 | 12/2003 | Srinivasa | 382/104 |
| 2006/0140481 A1 | 6/2006 | Kim et al. | 382/190 |
| 2006/0256200 A1 | 11/2006 | Matei et al. | 348/208.14 |
| 2007/0098222 A1 | 5/2007 | Porter et al. | 382/103 |
| 2007/0297696 A1 | 12/2007 | Hamza et al. | 382/294 |

OTHER PUBLICATIONS

USPTO Office Action for U.S. Appl. No. 12/359,916; Notification Date Jan. 26, 2012.

* cited by examiner

SYSTEMS AND METHODS FOR RECOGNIZING A TARGET FROM A MOVING PLATFORM

CROSS-REFERENCE TO RELATED APPLICATIONS

This application claims the benefit of U.S. Provisional Application No. 61/031,905, filed on Feb. 27, 2008.

TECHNICAL FIELD

The present invention generally relates to navigations systems, and more particularly relates to systems and methods for recognizing a target while a platform is in motion.

BACKGROUND

The need to detect and track targets (e.g., runways, landing strips, landing pads, roads, obstacles, objects, landmarks, and the like) from moving platforms is driving the development of sensor fusion and computer vision algorithms for next-generation situational awareness and navigation systems. For example, landing an aircraft, whether an unmanned air vehicle (UAV) or manned vehicle, requires accurate information about the location of the runway. Similarly, military targeting systems for urban environments require accurate localization to decrease or avoid altogether collateral damage and civilian casualties.

The navigation data extracted from multiple databases of current navigation data sources is not sufficient to accurately position an aircraft or other vehicle (e.g., motor vehicles, military vehicles, etc.) in relation to a target. Specifically, the resolution available using such navigation data sources is generally measured in meters, which may be too large a measurement for many purposes. That is, a low precision guidance system may become hampered by severe weather conditions, which may present a potential challenge for safely landing an aircraft, navigating motor vehicles along a terrestrial route, and/or tracking targets of interest.

With advances in computer vision and the increases in computing power, there exists a desire for the inclusion of accurate vision sensors as a major component in navigation and target positioning systems. Current vision sensors are designed to analyze sensor data from a moving platform in order to provide pilots or vehicle operators with additional features that, for example, enable pilots/operators to navigate aircraft or other vehicles, identify and avoid potential hazards/imminent threats, and/or obtain sufficient visual reference of the actual runway and or other target. In creating such systems, designers have had to deal several shortcomings including, for example, competing background clutter, changing background dynamics, noise, and/or other problems created by the motion/movement of the aircraft or vehicle.

On the other hand, the detection of targets is generally carried out through the implementation of segmentation and tracking techniques based on image correlation as maintained by a static platform hypothesis or static scene hypothesis, and subsequently, by analyzing the resultant sequence of frames independently. When there are significant changes in the scene or the target is moving rapidly, this type of analysis usually results in jitter due to incomplete motion compensation from the sensor and/or the platform.

Accordingly, there is a desire to provide systems and methods for recognizing the location of a target by analyzing real-time sensor images from moving platforms while compensating for the motion of the aircraft or vehicle. Furthermore, other desirable features and characteristics of the present invention will become apparent from the subsequent detailed description of the invention and the appended claims, taken in conjunction with the accompanying drawings and this background of the invention.

BRIEF SUMMARY

Various embodiments of the invention provide systems for recognizing the location of a target including one or more major edges and one or more minor edges. One system comprises a camera configured to generate first data representing an object resembling the target, a memory storing second data representing a template of the target and including edges corresponding to each major edge and each minor edge, and a processor coupled to the camera and the memory. The processor is configured to receive the first data and the second data, and determine that the object is the target if the object matches the template within a predetermined percentage error.

Methods for recognizing the location of a target including one or more major sides are also provided. A method comprises the steps of receiving first data representing an object having edges resembling the target, receiving second data representing a template of the target and including an edge corresponding to each major edge and minor edge, and determining that the object is the target if the object edges match the template major edges and minor edges within a predetermined percentage error.

Other embodiments of the invention provide computer-readable mediums including instructions that, when executed by a processor, cause the processor to perform methods for recognizing the location of a target including one or more major side. One exemplary computer-readable medium includes instructions that cause the processor to perform the steps of receiving first data representing an object having edges resembling the target, receiving second data representing a template of the target and including an edge corresponding to each major edge and minor edge, and determining that the object is the target if the object edges match the template major edges and minor edges within a predetermined percentage error.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
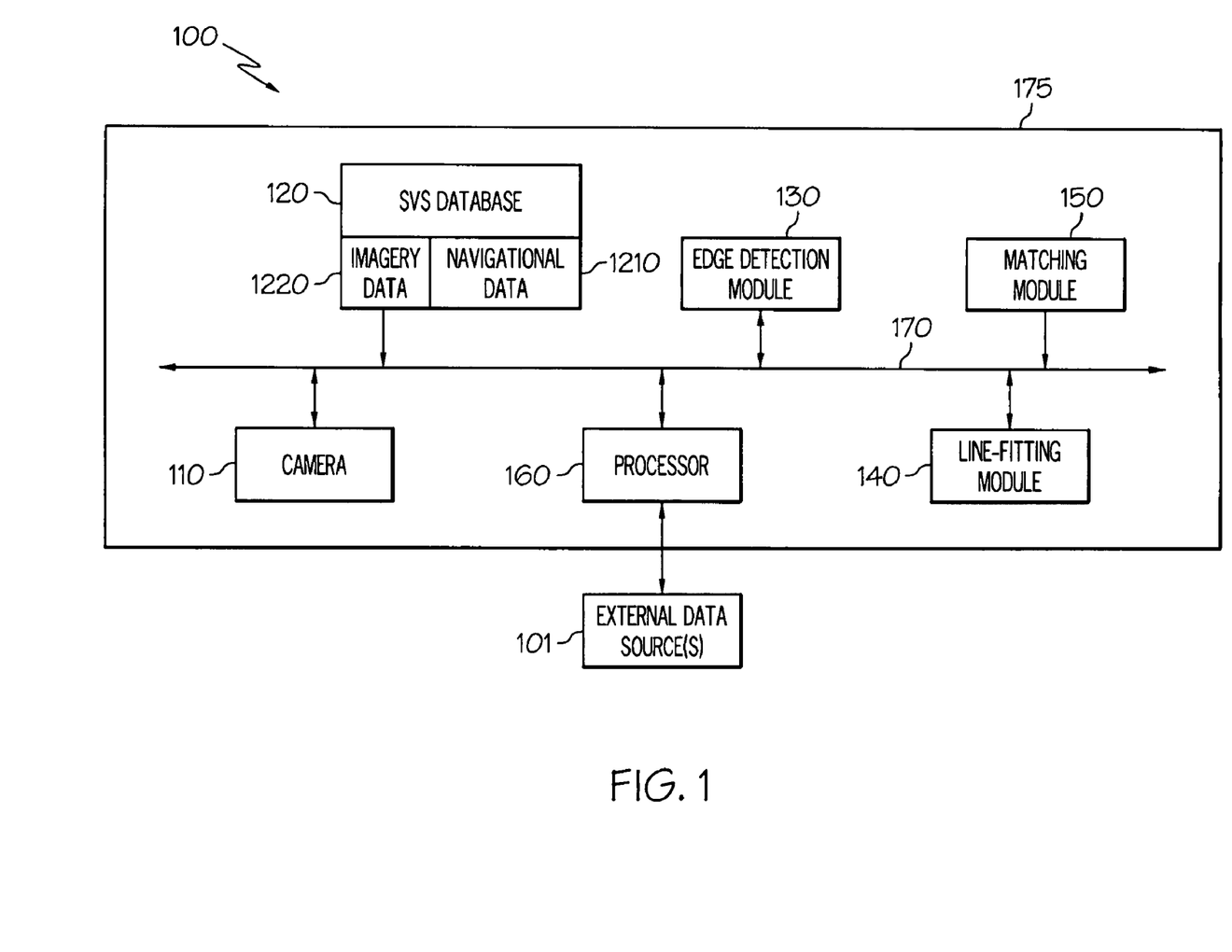
FIG. 1 is a block diagram of one embodiment of a system for recognizing the location of a target.

FIG. 1 is a block diagram of an exemplary system 100 for recognizing the location of a target. In the illustrated embodiment, system 100 comprises a camera 110, a synthetic vision system (SVS) database 120, an edge detection module 130, a line fitting module 140, a matching module 150, and a processor 160 coupled to one another via a bus 170. Processor 160 is also coupled to one or more external sources of data 101 (e.g., map databases, global positioning systems, navigation systems, etc.) related to various geographical regions.

Camera 110 may be an infrared (FLIR) camera or other type of camera configured to detect and capture one or more digital images of an environment surrounding camera 110. In one embodiment, camera 110 is a forward-looking camera including a predefined field of view that is mounted on, for example, an aircraft 175, a terrestrial vehicle (e.g., a motor vehicle, a military vehicle, etc.), or a marine vehicle (e.g., ship, submarine, etc.).

SVS database 120 is configured to store navigational data 1210 representing one or more regions of interest (ROI) including a target (e.g., a runway, a landing strip, a landing pad, a road, an obstacle, an object, a landmark, and the like) that is present in the environment being detected by camera 110. In addition, SVS database 120 is configured to store imagery data 1220 (e.g., target templates or target images) that mimics the corresponding real-world view of each target. That is, imagery data 1220 contains one or more target templates that estimate how a target should look from one or more visual perspectives.

Edge detection module 130 is configured to identify the boundaries or edges of a target utilizing a binary large object (BLOB) or a digital shape. In embodiments utilizing a BLOB, edge detection module 130 is configured to detect the curve(s) and/or contour(s) defining the BLOB boundaries or edges.

In embodiments utilizing a digital shape, edge detection module 130 is configured to apply a "brute force" edge detection algorithm to detect the boundaries or edges of the digital shape representing the object. Examples of a brute force edge detection algorithm include, but are not limited to, a Sobel edge detection algorithm, a Prewitt edge detection algorithm, a Roberts edge detection algorithm, a Laplacian transform of a Gaussian edge detection algorithm, a zero-cross edge detection algorithm, a Canny edge detection algorithm, and the like brute force edge detection algorithms.

The Sobel edge detection algorithm detects edges using a Sobel approximation of the derivative of a line. The Sobel edge detection algorithm returns edges at the points where the gradient of the object image, I, is a maximum value. The Prewitt and Roberts edge detection algorithms function in a matter to the Sobel edge detection algorithm, but use a Prewitt approximation of the derivative of a line and a Roberts approximation of the derivative of a line, respectively, to return edges at the points where the gradient of the object image, I, is a maximum value.

The Laplacian transform of Gaussian edge detection algorithm detects edges by looking for "zero" crossings after filtering the image, I, with a Laplacian of Gaussian filter. The zero-cross edge detection algorithm detects edges by looking for "zero" crossings after filtering image, I, with a predetermined filter. The Canny edge detection algorithm detects edges by looking for local maxima of the gradient of the image, I.

Line-fitting module 140 is configured to determine the line that best fits each boundary or edge of a BLOB or digital shape to define the boundaries of the object. Specifically, line-fitting module 140 includes one or more curve analysis algorithms configured to determine the line that best fits each boundary or edge of a BLOB or digital shape.

In one embodiment, an estimate for both the left and right boundaries/edges that fits the profile of a target template is performed using a least square calculation. That is, line-fitting module 140 is configured to use the right and left side estimates, and connect the top and bottom corners using lines. The resulting shape is a pre-estimate for the target that encloses the boundaries/edges of the true target BLOB or shape.

Subsequently, the object BLOB or shape profile points that are outside the margin of the true target BLOB/shape are considered outlier points. In one embodiment, to determine the appropriate threshold area α, line-fitting module 140 is configured to set a tolerance interval as a function of the ranging perspective within the captured image, while a smaller margin is preferred for effective filtering of outlier points near the top edge of the polygon (or top portion of another shape). Furthermore, a relatively larger margin is required near the bottom edge of the polygon (or bottom portion of another shape) to accommodate the effects of pixel spillage (e.g., shape irregularities appearing near the edges or boundaries of the target shape).

Line-fitting module 140 is also configured to determine whether each boundary/edge of a BLOB or shape is a "minor" boundary/edge or a "major" boundary/edge. Specifically, a minor boundary or edge is a boundary/edge that, when matched with a corresponding boundary/edge on a target template, may be indicative of a match. On the other hand, a major boundary or edge is a boundary/edge that, when matched with a corresponding boundary/edge on the target template, is indicative of a match. For example, in the scenario where the target is an aircraft runway forming a rectangle-shaped BLOB or digital shape, the left and right edges (i.e., the length) of the runway are major edges, while the top and bottom edges (i.e., the width) are minor edges. That is, since a significant defining characteristic of a runway is a long length and a relatively short width, the much larger left and right edges are more indicative of a runway than the relatively short width of the top and bottom edges. Accordingly, a BLOB or digital shape that includes boundaries/edges having a very long length is more likely to be a runway than a BLOB or digital shape having a relatively short width since many non-runway objects can have the same width as a runway.

Once the BLOB(s) or shape(s) are preprocessed, line-fitting module is configured to employ one or more line-fitting algorithms for estimating of the actual boundaries or edges of the target. One embodiment of a line-fitting algorithm included in line fitting module 140 fits the boundaries/edges using a modified Hough transformation. In one embodiment, the major sides of the object BLOB or digital shape and target template are determined and respectively paired. A Hough transformation is then applied to the paired major sides, and the estimated boundaries of the object BLOB/shape are intersected with the minor sides mapped directly from the target template features.

For a target that is, for example, a quadrilateral (e.g., an aircraft runway), a first object minor boundary (e.g., a bottom edge) that has a similar slope as the bottom edge of the target template is fit with a line that passes through the most pixels. A similar procedure is then followed for fitting a second object minor boundary that is parallel or opposite (e.g., a top edge) the first object minor boundary. The fitted lines are intersected with two fitted vertical lines to estimate the corners and major boundaries (e.g., the left and right edges) of the object BLOB or digital shape. The following mathematical discussion may be helpful in understanding the principles of this embodiment.

Figure 2A:
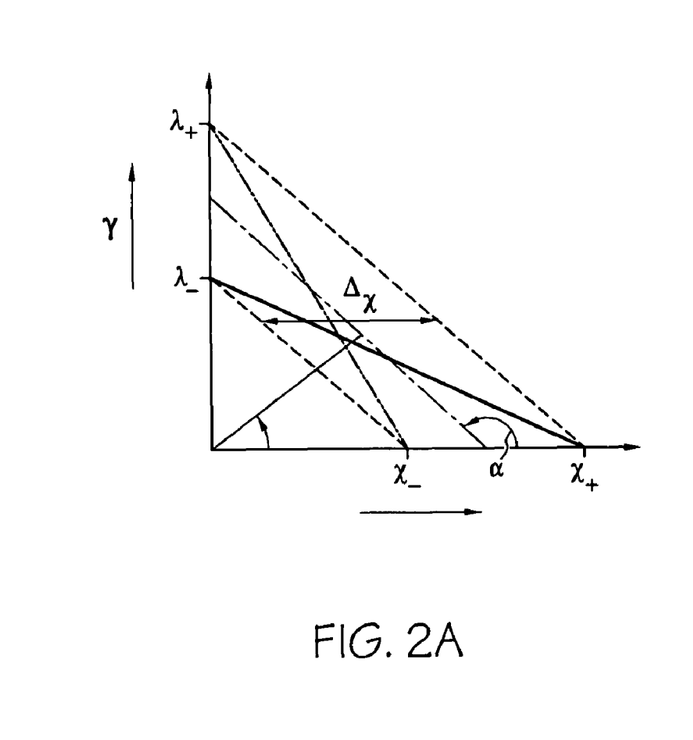
FIGS. 2A and 2B is a diagram illustrating limits defined in an image plane and an intercept-slope domain, respectively.

In analyzing a line on a major boundary, a line L is given the general intercept equation $y=x \tan \alpha + \lambda$. Shifting the x-axis using a predefined error margin, $\Delta_x$, results in two line limits with intercept coefficients $\tilde{\lambda} = \lambda \pm \Delta_x \tan \alpha$. That is, the slope of the vertical line varies as follows (see FIG. 2A):

$$\begin{cases} \tan\alpha^- = \dfrac{1}{\upsilon}\tan\alpha \\ \tan\alpha^+ = \upsilon\tan\alpha \end{cases} \text{ where } \upsilon = \dfrac{(\lambda - \Delta_x \tan\alpha)}{(\lambda + \Delta_x \tan\alpha)}. \quad (1)$$

Figure 2B:
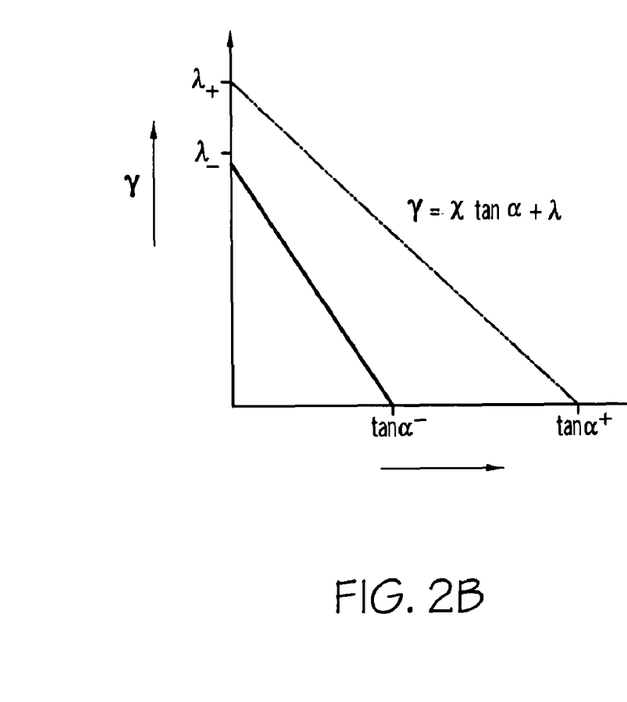

Given an estimated template line $y=x \tan \alpha_o + \lambda_o$ and a predefined delta shift $\Delta_x$, a Hough search can be limited to the following range (see FIG. 2B):

$$\begin{cases} \tilde{\lambda} = \lambda_o + c\tan\alpha_o \\ \tan\tilde{\alpha} = m\tan\alpha_o \end{cases} \text{s.t.} \begin{cases} c \in [-\Delta_x, \Delta_x] \\ m \in [\upsilon^{-1}, \upsilon] \end{cases}. \quad (2)$$

Using the polar representation (i.e. $x \cos \theta + y \sin \theta = \rho$), the Hough search can be specified by the following range:

$$\begin{cases} \tilde{\rho} = \rho_o + c\cos\theta_o \\ \tilde{\theta}_o = \cot^{-1}[m\cot(\theta_o)] \end{cases} \text{s.t.} \begin{cases} c \in [-\Delta_x, \Delta_x] \\ m \in [\upsilon^{-1}, \upsilon] \end{cases}, \quad (3)$$

where $\upsilon = \dfrac{(\rho_0 - \Delta_x \cos\theta_0)}{(\rho_0 + \Delta_x \cos\theta_0)}$.

In one embodiment, each contour point in the forward Hough transform is transformed from image space to $(\rho, \theta)$ space. The sequence of steps for doing such, according to one embodiment, are explained below.

The orientation of the actual target is within a certain margin of the target template orientation, as defined by equation (3). As an optimization procedure, the line search along the $\theta$ axis is limited using the margin defined in equation (3) as a function of the angle $\theta_o$ incurred by the target template.

For each contour point, $\alpha$ is computed using the polar representation of the line (i.e., $\alpha = x \cos(\theta) + y \sin(\theta)$). Next, the histogram, $H([\alpha][\theta])$, is found for each contour point. The coordinates of the point of intersection define the parameters of the line in the associated (x, y) space.

To handle sparse Hough matrices, one embodiment uses spatial grouping (e.g., smooth filtering) of Hough vote entries. For example, a 3×3 neighborhood kernel may be used in the spatial grouping. In the inverse Hough transform step, the line parameters may then be mapped from Hough space to Image space.

Another line-fitting algorithm included in line-fitting module 140 uses a least square technique. In one embodiment, a maximum likelihood estimate is computed for the interception variable provided that the line slopes in the object BLOB or shape are defined (e.g., slopes that are the same as lines in the target template). The following is a mathematical explanation of the least square algorithm.

A line, L, on either side of the target template can be represented by the general line equation, $y-x \tan \alpha + \lambda = 0$ and the boundaries or edges on either one side of the BLOB or shape contour can be represented by the equation, $P_k(x, y) \in \Omega$. The distance of the edges can then represented by the equation:

$$\text{dist}(P,L) = |y - x \tan \alpha + \lambda| / \|\vec{n}\|, \quad (4)$$

where $\vec{n} = (1, -\tan \alpha)$ is the vector of the coefficients normal to the line, L. Since the tangent angle is the same for all instances, the $\vec{n} = (1, -\tan \alpha)$ term can be dropped. Accordingly, the best line fit is the line that minimizes the $$\text{error}_e = \sum_{k=1}^{N} |\text{dist}(P_k, L)|^2.$$

In a least square sense, the solution may be represented by the following equation:

$$\sum_{k=1}^{N} |y_k - x_k \tan\alpha + \lambda|^2 = 0 \Rightarrow \hat{\lambda} = \frac{1}{N}\sum_{k=1}^{N}(x_k \tan\alpha - y_k). \quad (5)$$

Notably, $\tan \alpha$ is provided by the corresponding slope of a side (e.g., a left or right side) of the target template. Accordingly, each line may be estimated by two extreme points (e.g., P1 and P2), where:

$$\hat{P}_i = P\left(\frac{(y_i + \hat{\lambda})}{\tan\alpha}, y_i\right); i = 1, 2 \quad (6)$$

Yet another line-fitting algorithm included in line-fitting module 140 fits the edges using a modified random sample consensus (RANSAC) algorithm that is capable of removing extreme outlier points from the object BLOB or shape. In one embodiment, a subset of pixels that are within a predetermined margin of the predicted synthetic estimates is selected and a deterministic selection process (instead of a random selection process suggested by a typical RANSAC algorithm) is implemented. Once a suitable edge set consensus has been identified and a line instantiated, new points from the remaining edges that are consistent with the line model may be added to generate a larger set of reference points. The target edges can then be line fitted using a least square algorithm similar to the discussion above, but that is based on a larger set of reference points.

Still another line-fitting algorithm included in line fitting module 140 fits the edges using a Dirac algorithm using a weighted voting scheme to fit the target edges. In one embodiment, rather than using a binary voting algorithm, each point of the BLOB/shape edge is assigned a weight based on its distance from the corresponding point in the target template. The estimate matches are scaled using a Nascent Dirac 6 delta function, or a unit impulse function that decays rapidly away from the origin. In one embodiment, the weight optimization is based on the following formulation:

$$\hat{\lambda} = \arg\max\left(\sum_{k=1}^{N} \delta(y_k - x_k \tan\alpha + \lambda)\right). \quad (7)$$

A Cauchy distribution may then be used to represent the delta decaying function. The scale, a, determines the rate of decaying:

$$\delta_a(t) = \frac{1}{\pi} \frac{a}{(a^2 + t^2)} = \frac{1}{2\pi} \int_{-\infty}^{\infty} e^{ikt - |ak|} \, dk. \qquad (8)$$

To limit the search, one or more estimates using a least square technique may be used as inputs to the optimization process.

Figure 3A:
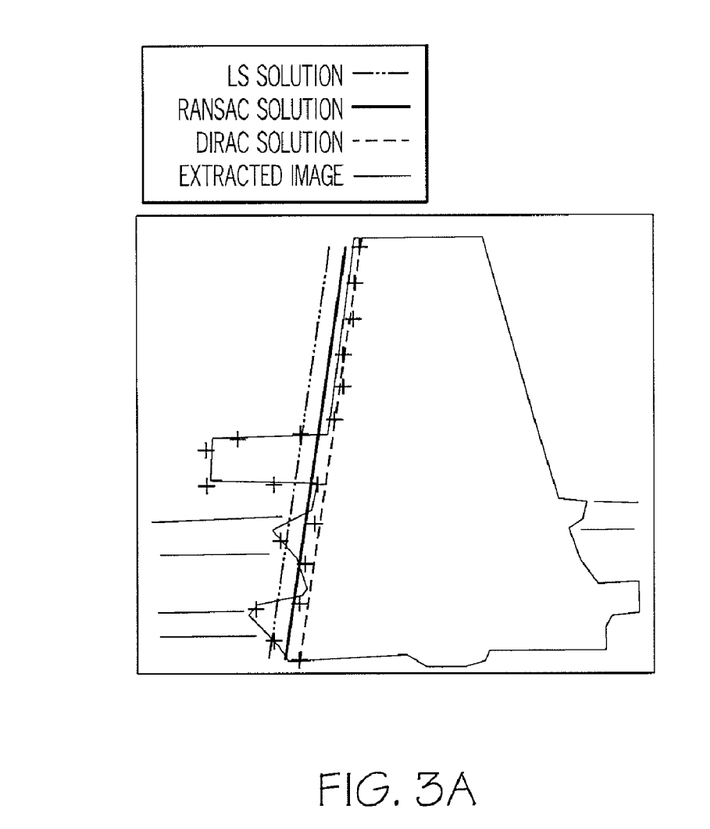
FIGS. 3A and 3B are diagrams illustrating a comparison of the results of a least square line-fitting algorithm, a RANSAC line-fitting algorithm, and a Dirac line-fitting algorithm.
Figure 3B:
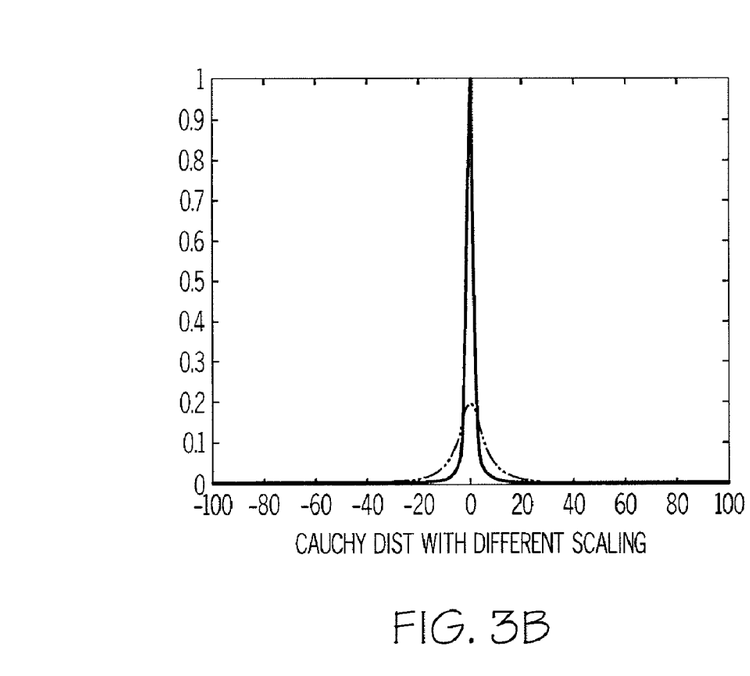

FIG. 3 illustrates a comparison of the results of the least square, the RANSAC, and the Dirac line-fitting algorithms. As illustrated, the Dirac line-fitting algorithm provides the optimum line fit. Moreover, the Dirac line-fitting algorithm provides better results than the modified Hough line-fitting algorithm since the Dirac line-fitting algorithm can be characterized as a Hough line-fitting algorithm that uses weighted edge points (e.g., values between 0 and 1, inclusive) based on the distance from the template edge point instead of absolute edge point values (e.g., 1 indicating a direct match and 0 indicating anything other than a direct match). That is, the Hough line-fitting algorithm assigns a value of, for example, 0 or 1 based upon whether the BLOB/shape edge point exactly matches the template edge point, whereas the Dirac line-fitting algorithm may assign, for example, a value of 1 for a direct match, a 0.9 value for an edge point that is a very close, but not a direct, match to the template edge point, a 0.5 value for relatively close matches, a 0.2 value for non-close matches, and a 0 value for an absolute non-match. Notably, the Dirac line-fitting algorithm may be scaled in any manner that assigns varying values to BLOB/digital shape edge points based on the distance the edge point is away from a corresponding edge point on the target template.

In each of the above line-fitting algorithms, estimates for the object BLOB/shape major sides are obtained by connecting the minor sides to one another using lines traced from the target template. The resulting object shape is an estimate of the object shape and can be compared to the target template to determine if the object shape matches the target template or, in other words, to determine if the object is an actual target.

Matching module 150 is configured to compare the resulting object shape, as determined by line-fitting module 140, and the target to determine if the object is an actual target. For example, let T be a quadrilateral template of a target, and let B be a resulting shape of the object. The object shape is compared to the target template by defining, for example, a direct Hausdorff distance that compares, in piecewise, the pixels on the boundaries or edges of the target template and the object shape, which can be defined as:

$$h(P(x, y), L_T) = \max_{P \in C_B} \left( \min_{L_T} |dist(P, L_T)| \right). \qquad (9)$$

Accordingly, a match may be based on a Hausdorff distance. In one embodiment, a match is based on the maximum Hausdorff distance in both directions, which is defined as:

$$H(L_T, \hat{L}) = \max(h(L_T, \hat{L}), h(\hat{L}, L_T)), \qquad (10)$$

where the mismatched points are the measure of a match and the target templates are defined a priori.

Figure 4:
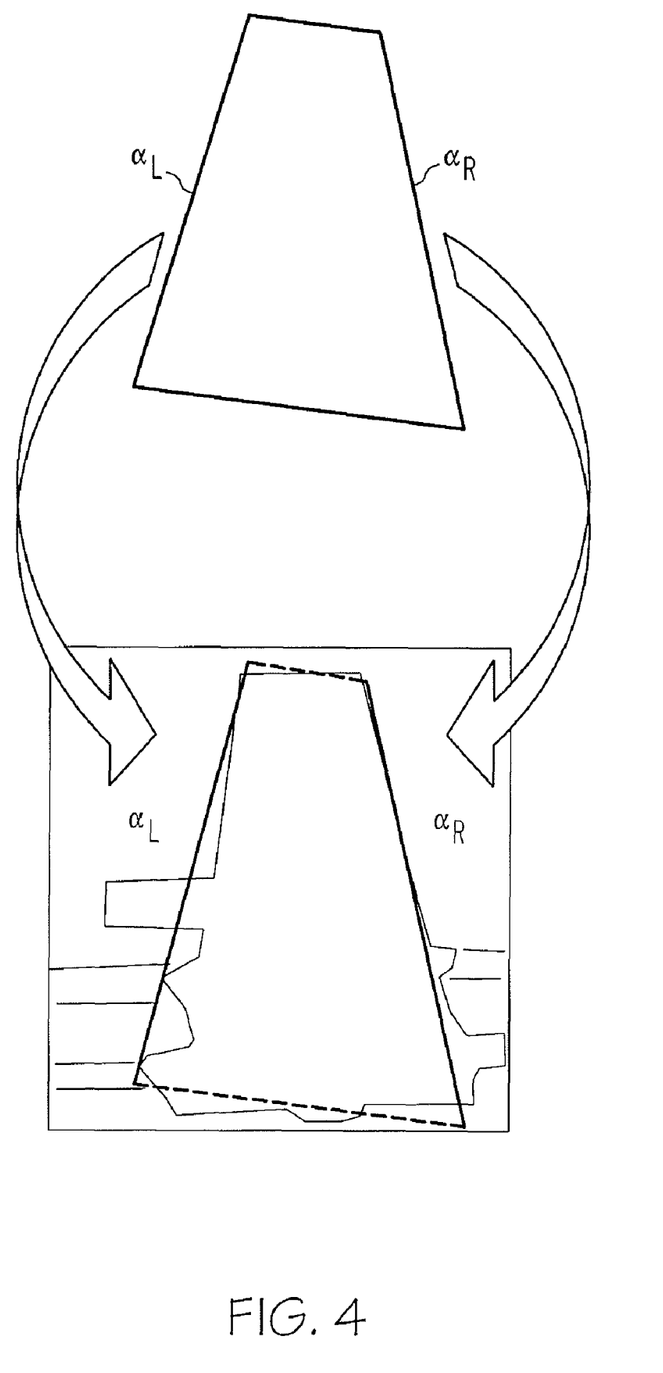
FIG. 4 is a diagram illustrating one embodiment of a rigid matching algorithm.

Various embodiments of matching module 150 include either "rigid" matching algorithm or a "flexible" matching algorithm. The rigid matching algorithm (see FIG. 4), in one embodiment, begins by aligning one of the major edges (the right edge, $\alpha_R$, in this example) of the target template and the corresponding edge on the object BLOB or shape. The target template may then be rotated and scaled to match the size of the object BLOB or digital shape, and the overall shape of the object BLOB or shape is then compared to the overall shape of the target template to determine if there is a match.

Figure 5A:
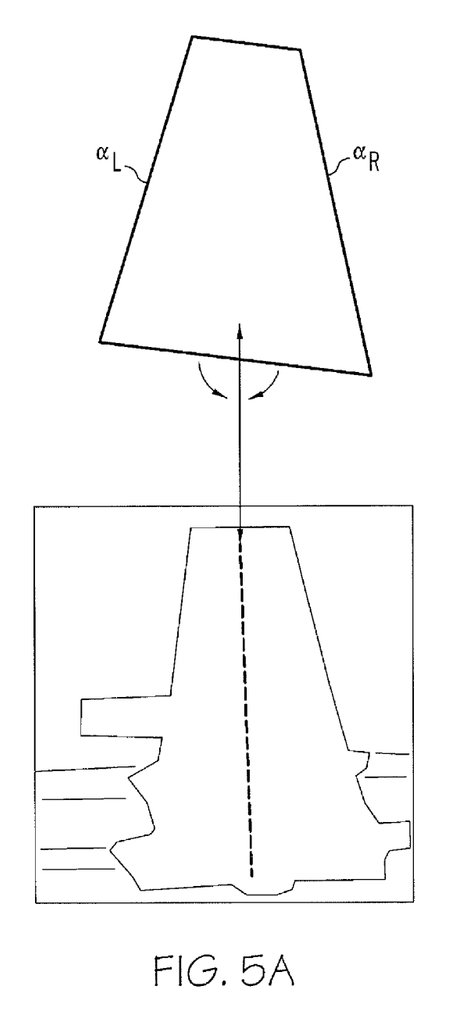
FIGS. 5A and 5B are diagrams illustrating one embodiment of a flexible matching algorithm.
Figure 5B:
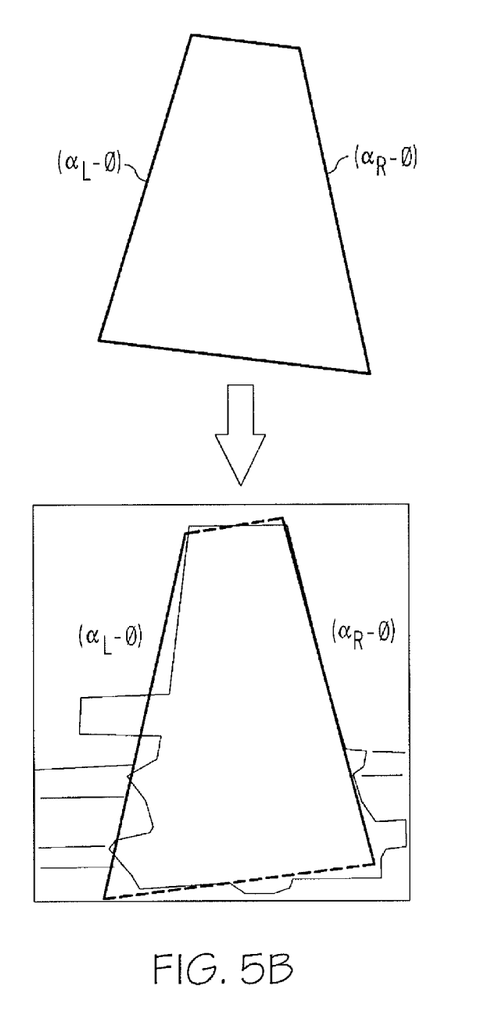

The flexible matching algorithm (see FIG. 5), in one embodiment, begins by determining the center of mass of the object BLOB or digital shape to centralize the target template on top of the object BLOB or shape. Matching module 150 is configured to then split the target template and the object BLOB or shape into two parts, the major edges and minor edges, and the geometric center of the target template is aligned to the center of mass of the object BLOB or shape. The slope of one or more of the major edges of the target template is then adjusted to match the slope of the corresponding edge of the object BLOB or shape, and the overall shape of the object BLOB or shape is then compared to the overall shape of the target template to determine if there is a match.

In determining a match using either the rigid or flexible matching algorithm, matching module 150 is configured to compare the major edges of the target template and the object BLOB/shape, and also to compare the minor edges of the target template and the object BLOB/shape. A match is determined if the error difference between the pairs of respective edges differ by less than a predetermined amount (e.g., 0-10% or another predetermined amount), with greater weight (i.e., a smaller error percentage or a greater error percentage) being given to a match/non-match of a major edge than a match/non-match of a minor edge. For example, a match may be determined if the major edges represent a very close match and the minor edges represent a close match, provided the weighted overall error percentage is within the predetermined amount. Alternatively, a non-match may be determined even if the major edges represent a direct match, but the minor edges represent an absolute non-match, provided that the overall weighted error percentage is outside the predetermined error amount. As one skilled in the art will recognize, the weighting differential between the major edges and the minor edges can vary depending on the desired accuracy of the match.

Processor 160 may be any processor, microprocessor, and/or the like capable of performing the operations/instructions contained in each of edge detection module 130, line-fitting module 140, and matching module 150. Processor 160 is further configured to calculate the actual location of the target after an object in a captured image has been identified as a target. Specifically, processor 160 is configured to correlate the location of the target/object in the captured digital image with the location of aircraft 175 (as received from external sources 101) at the time the image was captured to determine the actual location of the target/object. With the proper location of the target being identified, processor 160 is configured to determine an optimum path from the present location of aircraft 175 (or other vehicle) to the target.

The following example may be helpful in understating the operation of system 100. Furthermore, the following example is for illustrative purposes and is not intended to limit the invention in any manner.

In one embodiment, processor 160 receives one or more digital images of the environment captured by camera 110. Processor 160 then requests and receives navigation data 1210 and imagery data 1220 from SVS database 120 corresponding to the environment being detected by camera 110. Processor 160 then requests that external source(s) 101 transmit data indicative of the present location of system 100 (i.e., aircraft 175 or other vehicle) to processor 160. After processor 160 is informed of its present location, processor 160 requests navigational data 1210 (i.e., data representing the ROI and associated targets) and imagery data 1220 related to the present location of processor 160.

Processor 160 then processes each digital image obtained from camera 110, and any navigational data 1210 and imagery data 1220 received from SVS database 120. That is, processor 160 compares each digital image to its associated ROI in navigational data 1210 to determine if there are any objects in the digital image that resemble a target, and determines if the object(s) is/are actual targets.

In determining if one or more objects in the captured digital image(s) is/are a target, processor 160 utilizes edge detection module 130 to identify the boundaries or edges of a target via a binary large object (BLOB) or a digital shape. That is, processor 160 detects the curve(s) and/or contour(s) defining the BLOB boundaries or edges, or, in embodiments utilizing a digital shape, applies a "brute force" edge detection algorithm to detect the boundaries or edges of the digital shape representing the object.

After the edges of the object have been detected (i.e., a BLOB or digital shape is representing the object is created), processor 160 employs line-fitting module 140 to determine the line that best fits each boundary or edge of the BLOB or digital shape to define the boundaries of the object. Specifically, line-fitting module 140 performs one or more curve analysis algorithms (e.g., a modified Hough line-fitting algorithm, a RANSAC line-fitting algorithm, a Dirac line-fitting algorithm, etc.) to determine the line that best fits each boundary or edge of the BLOB or digital shape.

With the best-fit line determined, processor 160 then employs matching module 150 to determine if the object matches the target template (i.e., determines if the object is an actual target). In determining a match, processor utilizes the rigid matching algorithm or the flexible matching algorithm to compare the target template to the object BLOB or digital shape, and specifically, compare the respective major edges and minor edges for a match. If the comparison yields an error percentage less than a predetermined amount, a match is determined (i.e., the object is a target). Conversely, if the comparison yields an error percentage greater than the predetermined amount, a non-match is determined (i.e., the object is not the target) and such result is transmitted to a user.

When a match is determined, processor 160 determines the actual location of the object/target. Once the actual location of the object/target is determined, processor 160 informs the user and/or a navigation system (not shown) of the actual location.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

The invention claimed is:

1. A system for recognizing a location of a target including one or more major edges and one or more minor edges, comprising:
    a camera configured to generate first data representing an object resembling the target;
    a pre-stored database in a memory storing second data representing a template of the target and including edges corresponding to each major edge and each minor edge; and
    a processor coupled to the camera and the memory, the processor configured to:
        receive the first data and the second data, and
        determine that the object is the target if the object matches the template within a predetermined percentage error.

2. The system of claim 1, wherein the processor is further configured to:
    rotate the template to line-up the one or more object edges and the set of edges; and
    scale a size of the set of edges to a size of the one or more object edges.

3. The system of claim 2, wherein the processor is further configured to use the first data to determine an actual location of the target if the one or more object edges match the set of edges edge within the predetermined percentage error.

4. The system of claim 1, wherein the processor is further configured to:
    match a first major edge of the object and a first corresponding major edge of the template; and
    match a second major edge of the object and a second corresponding major edge of the template when making the determination.

5. The system of claim 4, wherein the processor is further configured to:
    calculate a first slope of the first object major edge and a second slope of the second object major edge;
    calculate a first intercept equation for the first slope and a second intercept equation for the second slope;
    add a predefined error margin to the first intercept equation and the second intercept equation to define a first range of slopes for the first slope and a second range of slopes for the second slope;
    perform a Hough search for a third slope in the first range that matches a fourth slope of the first corresponding major edge; and
    perform a Hough search for a fifth slope in the second range that matches a sixth slope of the second corresponding major edge.

6. The system of claim 5, wherein the processor is further configured to:
    compare the third slope, the fifth slope, or both to slopes of corresponding edges of the target template; and
    determine the percentage error based on the comparison.

7. The system of claim 5, wherein the processor is further configured to:
    perform a Dirac line-fitting algorithm on a first edge including the third slope; and
    perform a Dirac line-fitting algorithm on a second edge including the fifth slope.

8. The system of claim 7, wherein the processor is further configured to:
    compare the third slope, the fifth slope, or both to slopes of corresponding edges of the target template; and
    determine the percentage error based on the comparison.

9. The system of claim 8, wherein the processor is further configured to use the first data to determine an actual location of the target if the object is determined to be the target.

10. A method for recognizing a location of a target including one or more major edges and one or more minor edges, the method comprising the steps of:
    receiving first data representing an object having edges resembling the target;

receiving second data from a pre-stored navigation database, the second data representing a template of the target and including an edge corresponding to each major edge and minor edge; and determining that the object is the target if the object edges match the template major edges and minor edges within a predetermined percentage error.

11. The method of claim 10, wherein the determining step comprises the steps of:

rotating the template to line-up object edges and at least one template major edge; and scaling a size of the template to a size of the object.

12. The method of claim 10, further comprising the step of using the first data to determine an actual location of the target if the object is the target.

13. The method of claim 10, wherein the determining step comprises the steps of:

matching a first major edge of the object and a first corresponding major edge of the template; and matching a second major edge of the object and a second corresponding major edge of the template when making the determination.

14. The method of claim 10, wherein the determining step comprises the steps of:

calculating a first slope of the first object major edge and a second slope of the second object major edge;

calculating a first intercept equation for the first slope and a second intercept equation for the second slope;

adding a predefined error margin to the first intercept equation and the second intercept equation to define a first range of slopes for the first slope and a second range of slopes for the second slope;

performing a Hough search for a third slope in the first range that matches a fourth slope of the first corresponding major edge; and performing a Hough search for a fifth slope in the second range that matches a sixth slope of the second corresponding major edge.

15. The method of claim 14, wherein the determining step further comprises the steps of:

comparing the third slope, the fifth slope, or both to slopes of corresponding edges of the target template; and determining the percentage error based on the comparison.

16. The method of claim 14, wherein the determining step further comprises the steps of:

performing a Dirac line-fitting algorithm on a first edge including the third slope; and performing a Dirac line-fitting algorithm on a second edge including the fifth slope.

17. The method of claim 16, wherein the determining step further comprises the steps of:

comparing the third slope, the fifth slope, or both to slopes of corresponding edges of the target template;

determining the percentage error based on the comparison; and using the first data to determine an actual location of the target if the object is determined to be the target.

18. A non-transitory computer-readable medium including instructions that, when executed by a processor, cause the processor to perform a method for recognizing a location of a target including one or more major edges, the method comprising the steps of:

receiving first data representing an object having edges resembling the target;

receiving second data from a pre-stored navigation database, the second data representing a template of the target and including an edge corresponding to each major edge and minor edge; and determining that the object is the target if the object edges match the template major edges and minor edges within a predetermined percentage error.

19. The non-transitory computer-readable medium of claim 18, further including instructions that cause the processor to perform the steps of:

rotating the template to line-up object edges and at least one template major edge; and scaling a size of the template to a size of the object.

20. The non-transitory computer-readable medium of claim 18, further including instructions that cause the processor to perform the steps of:

calculating a first slope of the first object edge and a second slope of the second object edge;

calculating a first intercept equation for the first slope and a second intercept equation for the second slope;

adding a predefined error margin to the first intercept equation and the second intercept equation to define a first range of slopes for the first slope and a second range of slopes for the second slope;

performing a Hough search for a third slope in the first range that matches a fourth slope of the first corresponding edge;

performing a Hough search for a fifth slope in the second range that matches a sixth slope of the second corresponding edge;

performing a Dirac line-fitting algorithm on a first edge including the third slope; and performing a Dirac line-fitting algorithm on a second edge including the fifth slope.

* * * * *